United States Patent Office 3,388,110
Patented June 11, 1968

3,388,110
TELOMERS AND PROCESS FOR PREPARING THEM
Alfred Kühlkamp and Gerhard Werner, Hofheim, Taunus, Germany, assignors to Farbwerke Hoechst Aktiengesellschaft vormals Meister Lucius & Bruning, Frankfurt am Main, Germany, a corporation of Germany
No Drawing. Filed June 21, 1965, Ser. No. 465,783
Claims priority, application Germany, June 27, 1964, F 43,282
6 Claims. (Cl. 260—85.7)

ABSTRACT OF THE DISCLOSURE

Non cross-linked polymers having a molecular weight of from 500 to 5,000 prepared from acetoacetic acid allyl ester and at least one comonomer containing an olefinic double bond; also a process of making such polymers.

---

The present invention relates to telomers and to a process for preparing them from acetoacetic acid allyl ester and at least one comonomer containing an olefinic double bond.

It is known that in the copolymerization of allyl esters of unsaturated fatty acids with vinyl acetate at 100° C., using dibenzoyl peroxide as catalyst, gel-like, insoluble, i.e. cross-linked products are formed (cf. J. Amer. Chem. Soc., volume 69, page 2439 (1947)).

It has now been found that non cross-linked telomers can be obtained, partially in a quantitative yield, when, at a temperature of at least 80° C., advantageously in the range of from 100° C. to 200° C., acetoacetic acid allyl ester in which the acetoacetyl group is partially present as enol and which, therefore, contains a second carbon-carbon double bond suitable for cross-linking like allyl-esters of unsaturated fatty acids, is telomerized with at least one comonomer containing an olefinic double bond in one or more chain transferring solvents (telogenes) in the presence of at least one radical-liberating compound.

The process according to the invention yields acetoacetic acid allyl ester/vinyl ester telomers in a quantitative yield even in strongly regulating aromatic hydrocarbons in which, as it is known (German Patent 1,115,459); the free radical polymerization of vinyl esters, for example vinyl acetate, gives a poor yield.

The process according to the invention is carried out continuously or discontinuously, preferably under an inert gas, for example nitrogen or a noble gas.

As chain-transferring solvents (telogenes) there may be used aliphatic halohydrocarbons, preferably having 1 to 6 carbon atoms, such as methylene chloride, chloroform, 1-chloro-n-hexane; saturated aliphatic hydrocarbons with tertiary carbon atoms preferably having 6–18 carbon atoms altogether, such as 2-methyl-n-pentane, isooctane, isooctadecane; saturated aliphatic, primary and secondary alcohols preferably having 1 to 8 carbon atoms, such as methanol, isopropanol, n-butanol, octyl alcohol; as well as ketones, preferably aliphatic ketones having 3 to 5 carbon atoms, such as acetone and isopropyl-methyl-ketone. The process according to the invention is advantageously carried out, however, with at least one aromatic hydrocarbon carrying aliphatic groups as substituents containing at least one labile hydrogen atom. Especially suitable telogenes are compounds of the general formula

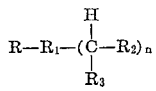

in which R stands for hydrogen or an oxalkyl group preferably having 1 to 5 carbon atoms, a halogen atom, or a nitro group, $R_1$ represents a benzene nucleus, $R_2$ and $R_3$ stand for hydrogen or alkyl groups preferably having 1 to 5 carbon atoms, or phenyl-alkylene groups preferably having 1 to 5 carbon atoms, and $n$ is an integer in the range from 1 to 4.

Suitable compounds of the above formula are, for example, cumene and toluene.

As radical-liberating compounds suitable as catalysts there can be used organic peroxides such as dialkyl peroxides, for example di-tert.butyl peroxide, diacyl peroxides, for example dilauroyl peroxide or dibenzoyl peroxide, as well as hydroperoxides, for example cumene hydroperoxide, tert.butyl hydroperoxide; or azo-compounds, for example azobisisobutyronitrile. In general, the catalysts are used in an amount in the range of from 0.5 to 10%, advantageously 1 to 5%, calculated on the weight of the monomers.

As comonomers capable of being copolymerized with acetoacetic allyl ester there are mentioned by way of example:

1. Vinyl esters in which the carboxylic acid component has 1 to 20 and preferably 2 to 12 carbon atoms, especially vinyl acetate, vinyl propionate, and vinyl isobutyrate;
2. Esters of acrylic, methacrylic, maleic and fumaric acid, advantageously the esters of the aforesaid acids and aliphatic, saturated, monohydric alcohols having 1 to 6 carbon atoms;
3. Styrene, vinyl chloride, vinylidene chloride, butadiene, and advantageously ethylene.

To carry out the telomerization according to the invention the acetoacetic acid allyl ester and the comonomer can be polymerized in any proportion. In general, it is advantageous to maintain the molar proportion of acetoacetic acid allyl ester to the comonomer or comonomers within the limits of 1:10 to 80:40, preferably 10:90 to 60:40.

In the process according to the invention the monomers and the catalyst can be heated to the reaction temperature in the solvent (telogene). However, it is more advantageous to heat the solvent and the monomers to the reaction temperature and then to add continuously the solution of the catalyst.

At the end of the reaction the solvent is distilled off. the telomers can be used without further purification. They may be purified by disolution and precipitation, for example in methylene chloride and petroleum ether.

According to investigations hitherto carried through the telomers approximately contain one chemically bound solvent molecule (telogene), without this being a limitation of the scope of the invention.

The telomers according to the invention can be used for the manufacture of casting resins, coatings and foamed materials.

In the following examples the content of acetoacetic acid allyl ester was determined according to the method of Straudinger described in Makromolekulare Chemie, volume 9, page 64 (1953) by titration or elementary analysis. The molecular weights were measured ebulliscopically. They were found to be in the range of from 500 to 5,000, and more particularly from 500 to 2,500. The molecular weight could be controlled by the selection of the telogene and the temperature applied.

The following examples serve to illustrate the invention but they are not intended to limit it thereto.

EXAMPLE 1

Apparatus used.—2 liter steel autoclave provided with stirrer, thermometer, manometer, heating means and connections for pumps.

SOLUTION I

Amounts used

| | Grams |
|---|---|
| Acetoacetic acid allyl ester | 200 |
| Vinyl isobutyrate | 300 |
| Cumene | 300 |

SOLUTION II

| | |
|---|---|
| Di-tert.butyl peroxide | 20 |
| Cumene | 800 |

The autoclave was charged with solution I, heated at the reaction temperature of 180° C. and then solution II was metered in over a period of 8 hours. The pressure rose to 9 atmospheres. After the addition of the catalyst, the reaction mixture was heated for a further hour at 180° C., allowed to cool and subsequently the cumene and unreacted monomer were distilled off under reduced pressure. The residue was freed from solvent remainders at 120° C. and 0.5 mm. of mercury. 470 grams of a viscous oil were obtained. The crude product was reprecipitated from methylene chloride/petroleum ether. It had an average molecular weight of 900.

EXAMPLE 2

Apparatus used.—As described in Example 1.

SOLUTION I

Amounts used

| | Grams |
|---|---|
| Acetoacetic acid allyl ester | 200 |
| Vinyl acetate | 300 |
| Cumene | 300 |

SOLUTION II

| | |
|---|---|
| Di-tert.butyl peroxide | 20 |
| Cumene | 600 |

The reaction was carried out as described in Example 1. 440 grams of a soft substance were obtained having a molecular weight of 1,460 and an acetyl content of 27%.

EXAMPLE 3

Apparatus used.—As described in Example 1.

SOLUTION I

Amounts used

| | Grams |
|---|---|
| Acetoacetic acid allyl ester | 200 |
| Vinyl acetate | 200 |
| Vinyl isobutyrate | 100 |
| Cumene | 400 |

SOLUTION II

| | |
|---|---|
| Di-tert.butyl peroxide | 20 |
| Cumene | 600 |

The reaction was carried out at described in Example 1. 450 grams of a viscous crude oil were obtained having a molecular weight of 900 and an acetoacetyl content of 24%.

EXAMPLE 4

Apparatus used.—As described in Example 1.

SOLUTION I

Amounts used

| | Grams |
|---|---|
| Acetoacetic acid allyl ester | 200 |
| Methacrylic acid methyl ester | 300 |
| Cumene | 500 |

SOLUTION II

| | |
|---|---|
| Di-tert.butyl peroxide | 20 |
| Cumene | 600 |

The reaction was carried out as described in Example 1. 470 grams of a solid substance were obtained having a molecular weight of 740.

EXAMPLE 5

Apparatus used.—As described in Example 1, with the exception that the steel autoclave used had a capacity of 5 liters.

SOLUTION I

Amounts used

| | Grams |
|---|---|
| Vinylisobutyrate | 600 |
| Acetoacetic acid allyl ester | 400 |
| Toluene | 600 |

SOLUTION II

| | |
|---|---|
| Di-tert.butyl peroxide | 35 |
| Toluene | 700 |

The reaction was carried out as described in Example 1. 1,000 grams of a viscous oil were obtained having a molecular weight of 1,400.

EXAMPLE 6

Apparatus used.—As described in Example 1, with the exception that the steel autoclave used had a capacity of 5 liters.

SOLUTION I

Amounts used

| | Grams |
|---|---|
| Vinyl isobutyrate | 600 |
| Acetoacetic acid allyl ester | 400 |
| Acetone | 600 |

SOLUTION II

| | |
|---|---|
| Di-tert.butyl peroxide | 35 |
| Acetone | 700 |

The reaction was carried out as described in Example 1. 920 grams of product were obtained having a molecular weight of 1,250.

EXAMPLE 7

Apparatus used.—As described in Example 1.

Under nitrogen the autoclave was charged wtih 500 grams of cumene and 120 grams of acetoacetic acid allyl ester. The autoclave was connected with an ethylene cylinder and ethylene was forced in until the pressure amounted to 38 atmospheres gauge at 25° C. The reaction solution was heated at about 170° C. and a solution of 20 grams of di-tert.butyl peroxide in 600 grams of cumene was pumped in over a period of 8 hours. The reaction was allowed to continue for 2 hours, the reaction mixture was cooled to 25° C. whereupon the pressure in the autoclave dropped to 25 atmospheres gauge. The pressure was released and the cumene and unreacted acetoacetic acid allyl ester were distilled off. 120 grams of a low viscous oil were obtained having a molecular weight of 460 and an acetoacetyl content of 15%.

EXAMPLE 8

Apparatus used.—As described in Example 1.

SOLUTION I

Amounts used

| | Grams |
|---|---|
| Vinyl propionate | 350 |
| Acetoacetic acid allyl ester | 200 |
| Isopropanol | 600 |

SOLUTION II

| | |
|---|---|
| Di-tert.butyl peroxide | 20 |
| Isopropanol | 550 |

The reaction was carried out as described in Example 1. 340 grams of oil were obtained having a molecular weight of 800.

EXAMPLE 9

Apparatus used.—As described in Example 1.

SOLUTION I

Amounts used

| | Grams |
|---|---|
| Acetoacetic acid allyl ester | 200 |
| Vinyl acetate | 300 |
| Methylene chloride | 500 |

SOLUTION II

| | |
|---|---|
| Azoisobutyronitrile | 15 |
| Methylene chloride | 500 |

The autoclave was charged with solution I, the solution was heated at 100° C. and then solution II was metered in over a period of 5 hours. The pressure rose to 7 atmospheres. After having added solution II the mixture was heated at 100° C. for a further hour and the methylene chloride was then distilled off. A soft substance remained behind. 482 grams of product were obtained having a molecular weight of 1,630 grams and an acetoacetyl content of 24%.

EXAMPLE 10

Apparatus used.—As described in Example 1.

SOLUTION I

Amounts used

| | Grams |
|---|---|
| Acetoacetic acid allyl ester | 200 |
| Vinyl isobutyrate | 300 |
| Methylene chloride | 500 |

SOLUTION II

| | |
|---|---|
| Azoisobutyronitrile | 20 |
| Methylene chloride | 500 |

The reaction was carried out as described in Example 9. 485 grams of crude product were obtained having a molecular weight of 2,080 and an acetoacetyl content of 22.5%.

EXAMPLE 11

Apparatus used.—As described in Example 1.

SOLUTION I

Amounts used

| | Grams |
|---|---|
| Acetoacetic acid allyl ester | 150 |
| Vinyl chloride | 450 |
| Methylene chloride | 600 |

SOLUTION II

| | |
|---|---|
| Azoisobutyronitrile | 18 |
| Methylene chloride | 500 |

The reaction was carried out as described in Example 9. 593 grams of crude product were obtained having a molecular weight of 1,420, an acetoacetyl content of 14.3% and a chlorine content of 42.3%.

EXAMPLE 12

Apparatus used.—As described in Example 1.

SOLUTION I

Amounts used

| | Grams |
|---|---|
| Vinyl chloride | 600 |
| Acetoacetic acid allyl ester | 200 |
| Chloroform | 750 |

SOLUTION II

| | |
|---|---|
| Azoisobutyronitrile | 15 |
| Chloroform | 600 |

The reaction was carried out as described in Example 9. 743 grams of crude product were obtained having a molecular weight of 850, an acetoacetyl content of 13.8% and a chlorine content of 44.3%.

EXAMPLE 13

Apparatus used.—As described in Example 1.

SOLUTION I

Amounts used

| | Grams |
|---|---|
| Acetoacetic acid allyl ester | 150 |
| Vinyl chloride | 200 |
| Methylene chloride | 300 |

SOLUTION II

| | |
|---|---|
| Vinylidene chloride | 400 |
| Methylene chloride | 300 |

SOLUTION III

| | |
|---|---|
| Azoisobutyronitrile | 15 |
| Methyl chloride | 300 |

The autoclave was charged with solution I, the solution was heated at 100° C. and then solutions II and III were metered in. Solution II was added over a period of 2 hours and solution III was added over a period of 4 hours. The pressure in the autoclave rose to 7 atmospheres. After having added solution III the reaction mixture was heated at 100° C. for a further hour and the methylene chloride was distilled off. 560 grams of telomer remained behind having a molecular weight of 900, an acetoacetyl content of 14% and a chlorine content of 53.4%.

We claim:

1. A process for preparing telomers, which comprises reacting acetoacetic acid allyl ester in the presence of 0.5 to 10%, calculated on the weight of the monomers, of at least one radical-liberating agent and at a temperature of at least 80° C., with at least one comonomer containing an olefinic double bond in at least one chain-transferring solvent, said chain-transferring solvent being selected from aliphatic halohydrocarbons, saturated aliphatic hydrocarbons having tertiary carbon atoms, saturated aliphatic primary and second alcohols, aliphatic ketones having 3 to 5 carbon atoms, and aromatic compounds of the formula

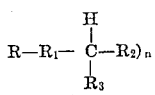

in which R stands for hydrogen, an oxalkyl group having 1 to 5 carbon atoms, a halogen atom, or a nitro group; $R_1$ represents a benzene nucleus; $R_2$ and $R_3$ stand for hydrogen, alkyl groups having 1 to 5 carbon atoms, or phenylalkylene radicals wherein the alkylene group has 1 to 5 carbon atoms; and $n$ is 1 to 4.

2. The process of claim 1, wherein the temperature is in the range of from 100 to 200° C.

3. The process of claim 1, wherein the chain-transferring solvent is a compound of the following general formula:

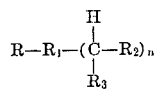

in which R stands for a member selected from the group consisting of hydrogen, an oxalkyl group having 1 to 5 carbon atoms, a halogen atom and a nitro group, $R_1$ stands for a benzene nucleus, $R_2$ and $R_3$ represent hydrogen, alkyl groups having 1 to 5 carbon atoms, and phenylalkylene groups having 7 to 10 carbon atoms, and $n$ is an integer in the range of from 1 to 4.

4. The process of claim 1, wherein the chain-transferring solvent is selected from the group consisting of cumene, toluene, methylene chloride, chloroform, acetone and isopropanol.

5. The process of claim 1, wherein the comonomer is a member selected from the group consisting of vinyl acetate, vinyl isobutyrate, vinyl propionate, methacrylic acid methyl ester, ethylene, vinyl chloride and vinylidene chloride.

6. Non-crosslinked telomers having a molecular weight of from 500 to 5,000 essentially composed of units derived from acetoacetic acid allyl ester, at least one comonomer containing an olefinic double bond and a telogen which is selected from aliphatic halohydrocarbons, saturated aliphatic hydrocarbons having tertiary carbon atoms, saturated aliphatic primary and secondary alcohols, aliphatic ketones having 3 to 5 carbon atoms, and aromatic compounds of the formula

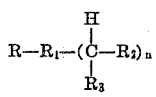

in which R stands for hydrogen, an oxalkyl group having 1 to 5 carbon atoms, a halogen atom, or a nitro group; $R_1$ represents a benzene nucleus; $R_2$ and $R_3$ stand for hydrogen, alkyl groups having 1 to 5 carbon atoms, or phenyl-alkylene radicals wherein the alkylene group has 1 to 5 carbon atoms; and $n$ is 1 to 4.

No references cited.

JOSEPH L. SCHOFER, *Primary Examiner.*

S. M. LEVIN, *Assistant Examiner.*